United States Patent [19]

Webb et al.

[11] Patent Number: 4,855,735

[45] Date of Patent: Aug. 8, 1989

[54] RECOVERY OF DATA CLOCK SIGNALS

[75] Inventors: Peter D. Webb, Derby; Peter Russhard, Nottingham; Lee Mansfield, Derby, all of England

[73] Assignee: Rolls-Royce PLC, London, England

[21] Appl. No.: 114,733

[22] Filed: Oct. 30, 1987

[30] Foreign Application Priority Data

Dec. 6, 1986 [GB] United Kingdom ............... 8629219

[51] Int. Cl.4 .......................... G08C 15/12; H04J 3/06
[52] U.S. Cl. ............................. 340/870.140; 375/112; 370/101; 370/111
[58] Field of Search .................. 340/870.140, 870.240; 370/101, 111, 100; 375/112, 110, 111

[56] References Cited

U.S. PATENT DOCUMENTS

| 4,039,748 | 8/1977 | Caron et al. | |
|---|---|---|---|
| 4,309,770 | 1/1982 | Godard. | |
| 4,390,986 | 6/1983 | Moses | 340/870.14 |
| 4,558,455 | 12/1985 | Epenoy et al. | 375/112 |
| 4,667,324 | 5/1987 | Graves | 375/112 |
| 4,713,702 | 12/1987 | Ishihara et al. | 370/101 |

Primary Examiner—Donald J. Yusko
Assistant Examiner—Tyrone Queen
Attorney, Agent, or Firm—Cushman, Darby & Cushman

[57] ABSTRACT

A single link digital telemetry system transmits data in serial form from a sending station. The data clock signal is recovered at a receiving station for data synchronization purposes. To achieve recovery of the data clock signal the incoming data is synchronized with a high frequency clock of n times the original data clock frequency; the fast clock is utilized to drive a data latch so that on each positive incoming data edge the latch produces a synchronized data pulse for feeding to a recirculating shift register n bits long, which is also driven by the fast clock. The original data pulse can be recovered merely by tapping off from a chosen location on the register. Continuity of recovery of the data clock signal is assured because even when synchronized data pulses are not being produced by the latch due to gaps or sequences of identical bits in the incoming data stream, the last digital word inserted into the register merely recirculates until the shift register is re-synchronized by the next synchronized data pulse occurring on the next incoming rising data edge.

10 Claims, 2 Drawing Sheets

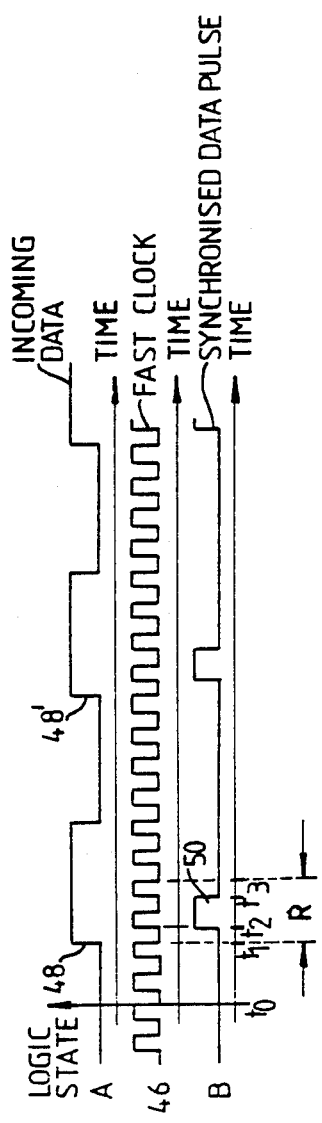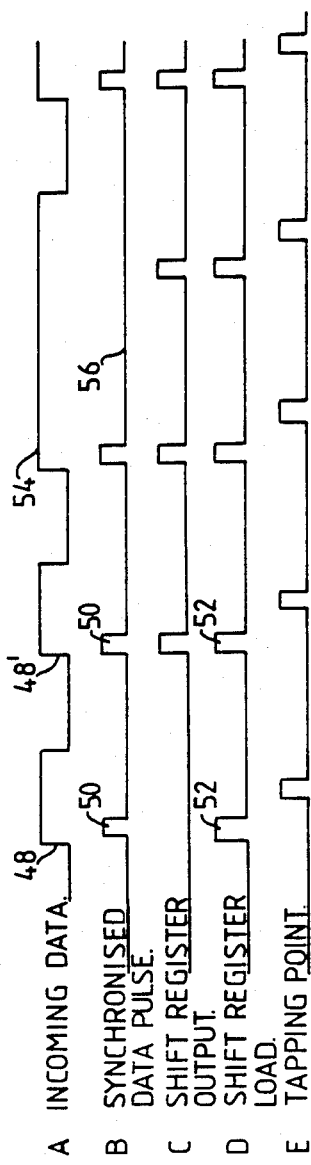

RECOVERY OF DATA CLOCK SIGNALS

FIELD OF INVENTION

The present invention relates to the recovery of data clock signals from serial data streams and is particularly relevant to digital telemetry systems in which the original data clock signal is recovered at a receiving station for data synchronization purposes.

BACKGROUND OF INVENTION

Data communications between two points are nowadays conveniently implemented using digital techniques. In the case of digital telemetry, considerations of cost, available bandwidth, distance between sending and receiving stations, and sometimes hostile enviroment, made it desireable to use just a single data link, such as one wire, one optical fibre, or one RF transmission path. In any such single-link digital transmission, the data bits must obviously arrive at the receiving station in serial fashion, even though they may have been multi-bit data words before transmission. Consequently, it is necessary to encode the data at the sending station so that when it is decoded after reception at the receiving station, the data can be correctly reconstructed.

A known method of encoding data words for serial transmission involves serialising the parallel bits of each word using a parallel-to-serial converter which is clocked at a constant rate so that each time a clock pulse is applied to the converter, one data bit appears at its output. The data is recovered after transmission to the receiving station by clocking the received data bits into a register, and it will be evident that in order to reconstruct the data accurately, the clock rate at the receiving station must be the same as at the sending station; furthermore, both clocks must bear the same phase relationship to the data bits. This is only conveniently achievable by deriving the clock pulse at the receiving station from the transmitted data itself by using the points in the data stream where the data values change (from 0 to 1 or vice-versa, ie. so-called "data edges") as references for recovering the clock pulse. A difficulty arises here in that long periods of constant data may sometimes be produced (ie. data all 1's or all 0's) and in that case lack of data edges in the incoming data would make it impossible to use them to recover the clock signal. For example, telemetry of measurements from transducers on a test bed may produce data words comprising all 0's at or before start-up and all 1's for maximum scale measurements. The usual remedy here is to "scramble" the data before transmission so that long periods of constant data do not occur, the data being unscrambled at the receiving station.

Well known techniques exist for scrambling and unscrambling of data, such as the use of pseudo-random binary sequence generators, or of Miller, Miller$^2$, and HDB3 telecommunications codes. However, in spite of the use of such techniques, the transmitted data will still contain short sequences of identical bits. It is known to overcome this difficulty by using the incoming data edges to stimulate an L-C-R tuned circuit into oscillation, the circuit being tuned to the required clock frequency; once the circuit has been set oscillating by a succession of incoming data edges, it will continue oscillating for a short while in the absence of such data edges. Hence, once the tuned circuit's sine wave output has been converted to square-wave pulses, a clock signal is available to substitute for the absent data edges. An alternative technique used for overcoming this difficulty is to use a gate-controlled oscillator to provide clock pulses. Here, the incoming data bits are used to set and reset the output of a logic gate which in turn is connected to a switch in the oscillator so as to repeatedly turn the oscillator on and off, the arrangement being that if data edges are present, the oscillator does not output clock pulses, but if two or more successive bits are identical, then the oscillator provides the necessary number of clock pulses to substitute for the absent data edges.

A serious problem can arise when using tuned circuits or gated oscillators to recover the data clock signal in the above way. This problem is connected with the fact that for a telemetry system to transmit and receive perfectly square pulses representing the data bits requires a transmission link of infinite bandwidth. Obviously, in a single link system only a restricted bandwidth is available, and therefore after transmission the data pulses are not exactly of square-wave form. Since the clock pulses for synchronization at the receiving station are generated when the received data edges cross threshold voltage levels in trigger circuits (eg. in a zero crossing detector circuit), it will be seen that non-square incoming data edges will cause the clock pulses to be triggered slightly earlier or later than they would have been if the data edges had been perfectly square. This phenomenon is called "time skew". At low data bit transmission rates time skew of the clock pulses at the receiving station with respect to the clock pulses at the sending station is not a problem, but at high data rates—say, in excess of 6 Mb/second—the amount of time skew becomes a significant percentage of the time between successive bits. In this case it becomes difficult to synchronize the clock pulses with the incoming data edges, leading to possible loss of data.

An object of the present invention is to provide a way of recovering the data clock signal at the receiving station which avoids the above problem of data loss at high data rates.

SUMMARY OF THE INVENTION

According to the present invention, apparatus for recovering a data clock signal from a serial data stream, successive like data edges of which may be separated by multiples of the data clock signal period, comprises:
 (a) high speed clock means for producing clock pulses at a high frequency which is a whole number multiple n of the frequency of the data clock signal to be recovered;
 (b) synchronizing means for synchronizing a preselected data edge of each successive logical one data bit with one of the high frequency clock pulses and outputting a synchronized data pulse each time said synchronizing occurs;
 (c) recirculating shift register means clocked by said high speed clock means and having a length of x.n bits, where x is a positive integer;
 (d) OR gate means for receiving the synchronized data pulses and the recirculating bits from the output of the shift register means and outputting a logical one bit to the shift register means each time said OR gate means receives one of said synchronized data pulses and/or one of said recirculating bits; and (e) means for outputting bits from said shift register means such that said bits constitute a series of pulses representing said data clock signal.

The high frequency mentioned above should be at least four times the data clock frequency and in the preferred embodiment is eight times the frequency of the data clock signal to be recovered.

Conveniently, the synchronizing data means comprises a clocked data latch, such as an edge-triggered D-type flip-flop.

For simplicity, we prefer that the recirculating shift register means has a length of n bits, said means for outputting bits therefrom comprising a single tapping at a preselected location in the shift register means. Preferably, this location is such that logical one outputs therefrom (which constitute the recovered data clock pulses) will not be time-coincident with rising or falling data edges in said serial data stream.

Preferably, said means for outputting bits from said shift register includes signal shaping means adapted to adjust the mark-space ratio of the recovered data clock signal.

BRIEF DESCRIPTION OF THE DRAWINGS

An embodiment of the invention will now be described, by way of example only, with reference to the accompanying drawing, in which:

FIGS. 2 and 3 illustrate relationships between various signals present in the circuitry at the receiving station of FIG. 1.

DETAILED DESCRIPTION OF THE DRAWINGS

Figure 1:
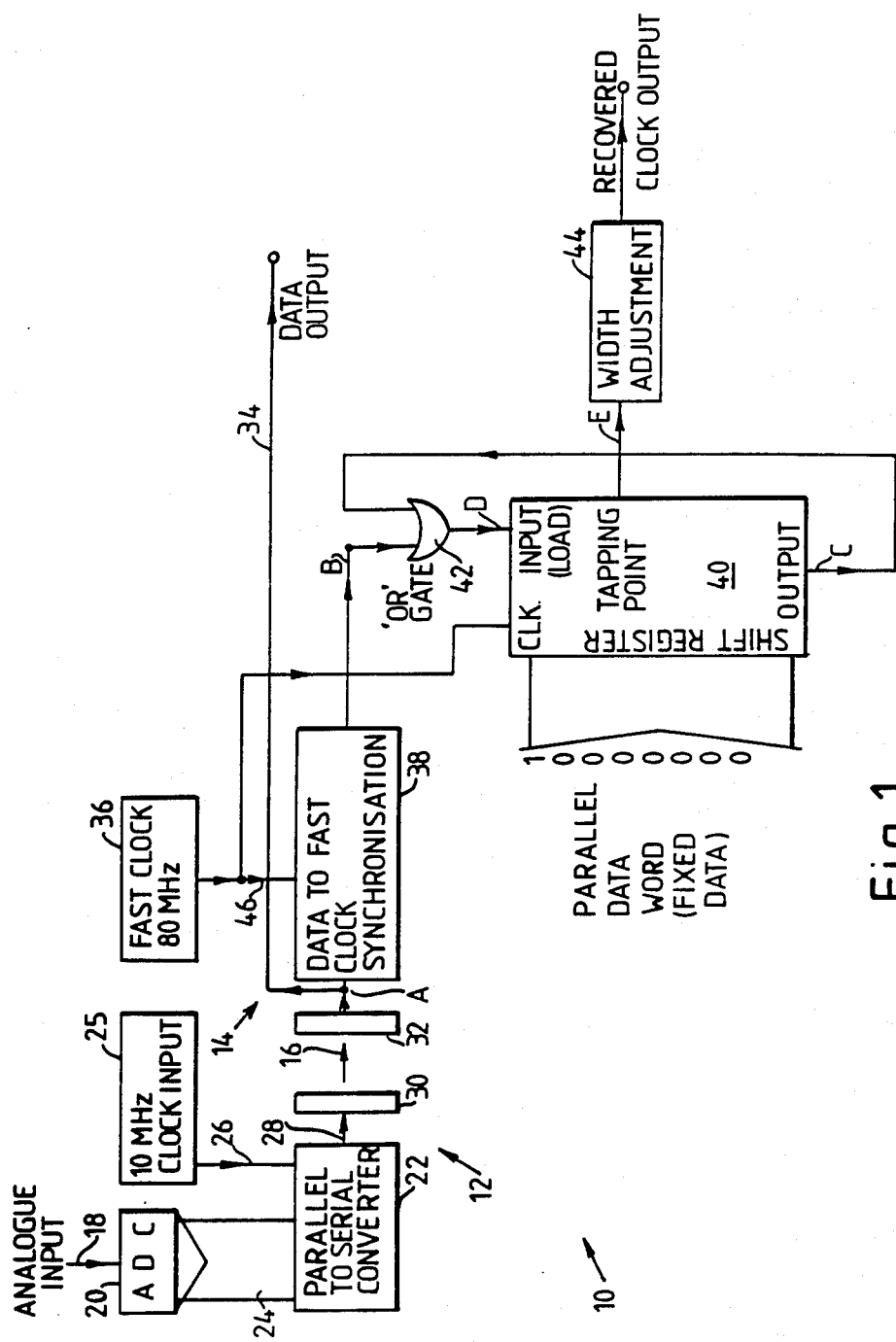
FIG. 1 is a block diagram illustrating in simplified form a single link digital telemetry system incorporating, at the receiving station, circuitry in accordance with the invention whereby the data clock signal used at the sending station may be recovered.

Referring to FIG. 1, the digital telemetry system as shown broadly comprises a data sending station 12 and a data receiving station 14 connected via a radio frequency link 16. For the purposes of describing a particular embodiment of the invention, it will be assumed that the sending station 12 is located on or in a gas turbine engine (not shown) which is undergoing tests in a test cell (not shown), and that the receiving station 14 is located elsewhere in the test cell building at a distance from the engine under test. Due to considerations of cost and the hostile enviroment of the aero engine the radio frequency link 16 comprises a single transmission path, conveniently a frequency modulated transmission at 400 MHz.

At the sending station 12, analogue signals 18 from transducers on the engine are input to an analogue-to-digital-converter 20 which converts them to 8 bit binary numbers for input to the parallel-to-serial converter 22 via data link 24. Thereupon the eight parallel bits of each successive data word are serialised with reference to a 10 MHz clock input signal 26 from a clock pulse generator 25, so that a data bit appears on line 28 at the output of the converter 22 each time a clock pulse 26 is applied . Serialisation of the data is of course required because of the single RF transmission path 16. The serialised data on line 28 is input to a suitable radio transmitter 30 for transmission to the receiving station 14. The transmitter 30 may also incorporate a means for scrambling the data if such is considered to be required.

At the receiving station 14 a radio receiver 32 receives the transmitted data and outputs it, still in serialised form, on line A. As known, the radio receiver 32 incorporates suitable signal amplification and conditioning circuitry for making the serial data stream output thereby suitable for subsequent processing. The serial data stream output by receiver 32 is passed directly to the data output of the receiving station 14 on line 34, but as mentioned previously accurate reconstruction of the output from the ADC 20 at the sending station 12 requires accurate recovery of the original data clock input 26. This task is performed by the rest of the circuitry shown in FIG. 1 as forming part of the receiving station 14.

In brief, the data clock recovery circuitry comprises a high speed (80 MHz) clock pulse generator 36, a synchronizing circuit 38 which synchronizes the incoming data bits with the high speed clock 36, a recirculating shift register 40, and an input gate 42 for the shift register 40, this being an OR gate connected to receive pulses on line B from the synchronizing circuit 38 and on line C from the shift register output. The recovered data clock appears on line E from a suitable tapping point on the shift register 40. If required, the width of the recovered data clock signals (ie. their mark-space ratio) may be adjusted by signal conditioning circuitry 44 before the recovered data clock signal is finally output for comparison with the data output on line 34.

In more detail, the synchronizing circuit 38 conveniently comprises a known type of edge-triggered D-type flip-flop or latch, the high speed clock 36 being connected to the latch's data intput on line 46 and the incoming data stream on line A being connected to the latch's clock input so that the latch gives a logical one output pulse on line B each time the leading or rising edge of a logical one data bit in the data stream enters the latch. FIG. 2 shows the timing diagram for the operation of the synchronizing circuit 38, the signals on lines A, B and 46 being shown in time relationship to each other.

At an arbitary starting time $t_0$, it is assumed that the latch circuit which performs the synchronizing function is in the Reset condition, the logic level in the incoming data stream on line A is 0, the fast clock signal on line 46 to the latch's data input is transitioning from 1 to 0, and the latch's output on line B is 0. During the subsequent two fast clock cycles the incoming data, connected to the latch's clock input, remains at logical 0 and so the clock transitions do not affect the output on line B, which stays at 0. At a time $t_1$ an incoming data edge 48 causes the latch's clock input to go to logical 1, but in the present example this happens to occur just when fast clock on line 46 is transitioning back to 0 and so the latch is not put into the Set condition until the next clock pulse occurs at $t_2$. As soon as the latch goes into the Set condition, its output on line B goes to logical 1, but as will be apparent to the person skilled in the art, the next fast clock pulse on the latch's data input at time $t_3$ will cause the latch to be Reset, thus putting line B back to logical 0. From the above it will be seen that the latch has acted to synchronize the onset of the incoming rising data edge 48 with a single cycle of the fast clock to give a synchronized data pulse 50 on line B of width equal to the cycle of the fast clock. This will of course happen again on the next rising data edge 48' in the incoming data stream. It will also be seen that the total time range R within which the synchronized data pulse 50 can be produced (depending upon the exact time of onset of the incoming data edge 48 with respect to the fast clock pulses) is equal to two fast clock cycles.

The time relationships between the various signals on lines A,B,C,D and E are shown in FIG. 3, and referring now to FIGS. 1 and 3 together, line B connects the output of the synchronization circuit 38 to one of the two inputs of the OR gate 42. Thus, each time one of the synchronized data pulses 50 is input to the gate 42, a corresponding pulse 52 is output from the gate to the shift register 40 on line D. This sets the initial element of the shift register 40 to the logical one state, which means, as indicated in FIG. 1, that a parallel data word of fixed value 10000000 is loaded into the shift register for recirculation each time one of the synchronized data pulses 50 is produced. Because the shift register 40 is 8 bits long and is being clocked at a rate of eight times that of the data clock 25, each input bit 50 on line D will have been output from the shift register on line C and recirculated to arrive at the other input of gate 42 substantially synchronously with the arrival of the next data pulse 50 at the gate. When- ever two or more sucessive bits in the incoming data stream are identical, as shown at 54 in FIG. 3, there will be a corresponding gap 56 in the stream of synchronizing data pulses 50 on line B. However a logical one bit 52 will still be loaded into the shift register by OR gate 42 at the appropriate time because the input bit resulting from the previous synchronized data pulse 50 will have been re-circulated back to the OR gate 42 for clocking into the shift register at substantially the same moment the synchronized data pulse 50 should have arrived. It will now be realised that the original data clock signal is easily recoverable from the shift register by continuously reading the logical level of any element within it. In the present case a tapping point part of the way along the shift register is chosen in order that the recovered clock output pulses appearing on line E should not be coincident in time with any of the leading and trailing edges of the data bits appearing on line 34. In order to be suitable for use as clock signals the output pulses on line E may require adjustment of their mark-space ratio in circuitry 44, using known techniques.

As will be realised by the specialist the above arrangement makes it possible to cope with long periods in which sucessive incoming data bits are identical, since the resulting gaps in the stream of synchronized data pulses allow the previously input digital word to re-circulate, thereby still reproducing the original data clock signal. Very long periods of identical incoming data bits will produce a slight drift in the frequency of the recovered data clock signal as compared with the original data clock due, for instance, to slight variations in the absolute speeds of the original data clock signal at the sending station 12 and the fast clock 36 at the receiving station 14. However, such frequency drift will not be serious and will be corrected when the next positive going data edge in the incoming data stream arrives, since the synchronizing circuit 38 will effect the re-synchronisation of the shift register 40 to the new data edge.

It will be apparent to the specialist that some alterations may be made to the above system without departing from the scope from the invention. For instance, in cases where the data being generated is inherently serial, ie. a transition between two states, the parallel-to-serial data converter 22 at the sending station 12 will not be needed. Furthermore, the exemplary data clock and fast clock speeds of 10 MHz and 80 MHz respectively may be changed both in absolute terms and in their ratio to each other. Nevertheless, it will be apparent that the fast clock 36 must be an integer number of times (preferably, at least four times) faster than the data clock 25 and that the length of the shift register must correspond to that integer, or a multiple of it. In the latter case, however, recovery of a clock frequency identical to that of the data clock would require a number of equally spaced tapping points on the shift register 40 equal to the above-mentioned multiple, the lines from the tapping points being OR'd together.

In the above description the rising or leading data edge of each sucessive logical one data bit in the incoming data stream will be synchronized with one of the high frequency clock pulses, but of course by using a suitably modified gate circuit it would be possible to synchronize on the falling or trailing data edges of the incoming data and this would also be within the scope or invention.

It will also be apparent to one skilled in the art that although the apparatus for putting the invention into effect has been specifically described in terms of various circuit elements or modules connected together, the apparatus could in fact comprise an appropriately programmed digital computer and such a computer should be construed as being within the scope of the invention.

We claim:

1. Apparatus for recovering a data clock signal from a serial data stream, successive like data edges of which may be separated by multiples of the data clock signal period, comprising:
   (a) high speed clock means for producing clock pulses at a high frequency which is a whole number multiple n of the frequency of the data clock signal to be recovered;
   (b) synchronizing means for synchronizing a preselected data edge of each successive logical one data bit with one of the high frequency clock pulses and outputting a synchronized data pulse each time said synchronizing occurs;
   (c) shift register means clocked by said high speed clock means and having input means and output means, the output means being connected to the input means for recirculating data bits through the shift register means, the shift register means having a length of x times n bits, where x is a positive integer;
   (d) OR gate means, having an output connected to said shift register input means, for receiving the synchronized data pulses and the recirculating bits from the output means of the shift register means and outputting a logical one bit to the shift register means each time said OR gate means receives at least one of said synchronized data pulses and said recirculating bits; and
   (e) further output means for outputting bits from said shift register means such that said output bits constitute a series of pulses representing said data clock signal.

2. Apparatus according to claim 1 wherein the high frequency is at least four times the frequency of the data clock signal to be recovered.

3. Apparatus according to claim 2 wherein the high frequency is eight times the frequency of the data clock signal to be recovered.

4. Apparatus according to claim 1 wherein the synchronizing means comprises a clocked data latch.

5. Apparatus according to claim 1 wherein the shift register means has a length of n bits and said further output means for outputting bits therefrom comprises a single tapping at a pre-selected location in the shift register means.

6. Apparatus according to claim 5 wherein said location in the shift register means is such that logical one outputs therefrom will not be time-coincident with rising of falling data edges in the serial data stream.

7. Apparatus according to claim 1 in which said further output means for outputting bits from said shift register means includes signal shaping means adapted to adjust the mark-space ratio of the recovered data clock signal.

8. A method of recovering a data clock signal from a serial data stream, successive like data edges of which may be separated by multiples of the data clock signal period, comprising the steps of:

(a) generating clock pulses at a high frequency which is a whole number multiple n of the frequency of the data clock signal to be recovered;

(b) synchronizing a predetermined data edge of each successive logical one data bit with one of the high frequency clock pulses and producing a synchronized data pulse each time said synchronizing occurs;

(c) clocking a shift register means at said high frequency, said shift register means having a length of x times n bits, where x is a positive integer;

(d) inputting logical one bits into said shift register means by ORing together the synchronized data pulses and an output from the end of said shift register means; and (e) outputting bits from a predetermined logical element of said shift register means thereby to constitute a serial output of output bits representing said data clock signal.

9. A method according to claim 8 wherein the high frequency is at least four times the frequency of the data clock signal to be recovered.

10. A method according to claim 9 wherein the high frequency is at least eight times the frequency of the data clock signal to be recovered.

* * * * *